(No Model.)
F. H. SNYDER.
PROCESS OF PURIFYING GAS CARBON.
No. 357,103. Patented Feb. 1, 1887.
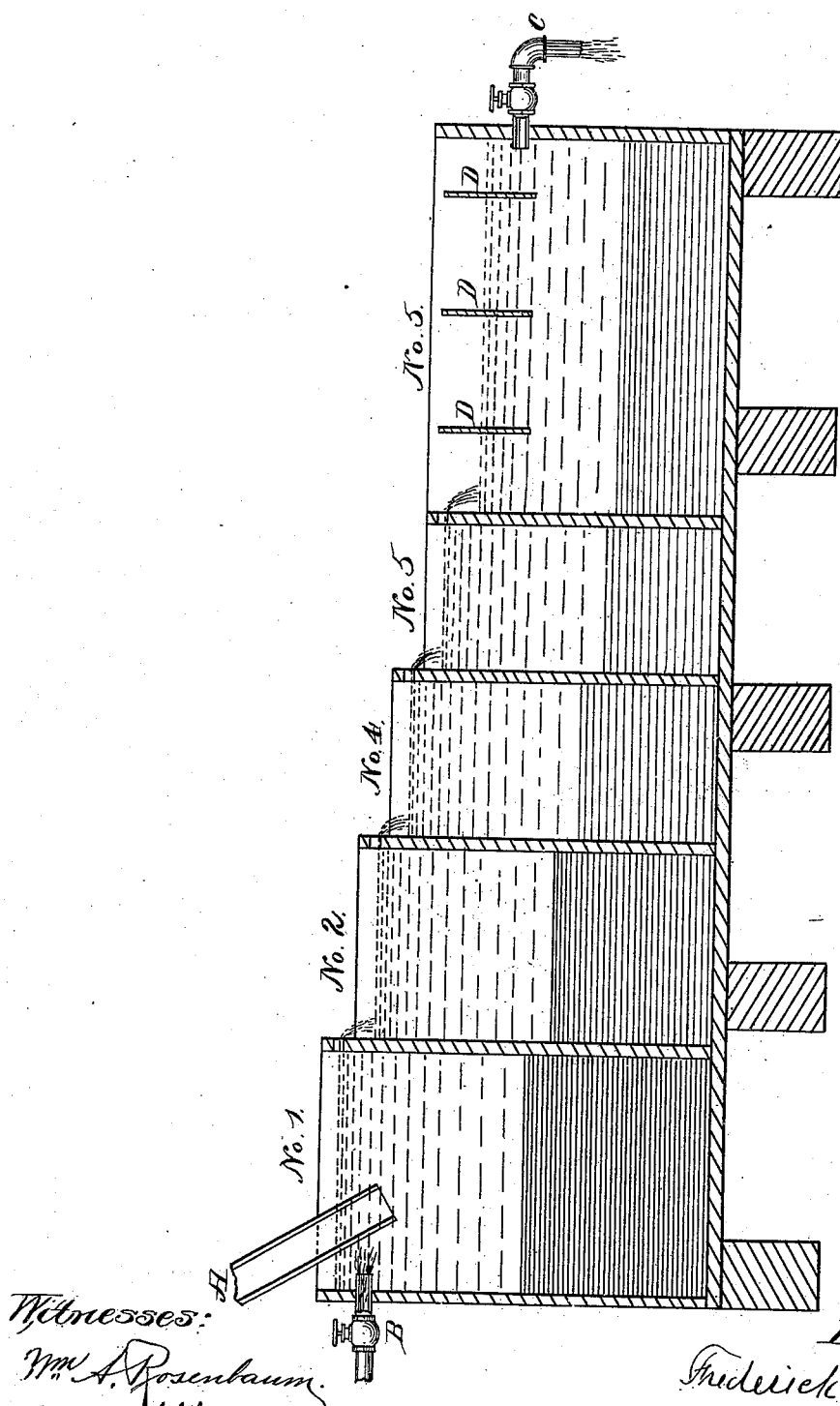

UNITED STATES PATENT OFFICE.

FREDERICK H. SNYDER, OF JERSEY CITY, NEW JERSEY, ASSIGNOR OF ONE-THIRD TO GEORGE W. RICHARDSON AND MARTIN LUSCOMB, BOTH OF BOSTON, MASSACHUSETTS.

PROCESS OF PURIFYING GAS-CARBON.

SPECIFICATION forming part of Letters Patent No. 357,103, dated February 1, 1887.

Application filed May 15, 1883. Serial No. 95,045. (No specimens.)

*To all whom it may concern:*

Be it known that I, FREDERICK H. SNYDER, a citizen of the United States, residing at Jersey City, in the county of Hudson and State of New Jersey, have invented certain new and useful Improvements in Processes of Treating Gas-Carbon; and I do hereby declare that the following is a full description of the invention, which will enable others skilled in the art to which it appertains to make and use the same.

My invention relates to a process of obtaining purified gas-carbon—that is to say, a gas-carbon from which all mineral and metallic elements and soluble salts are removed. The crude carbon found adherent to the interior of retorts used for the manufacture of illuminating-gas differs essentially in all its physical characteristics from other forms of carbons, and when purified by the process or method of treatment herein described possesses, in a higher degree than any other forms of matter known to me, the essential properties desired in material for the manufacture of products such as filaments for incandescent and pencils for arc electric lights. The crude substance is the result of decomposition by heat and pressure of the volatile hydrocarbon of the coal, and is deposited under varying conditions, and in a measure with varying results as to its value for use in the arts. It is approximately pure as it comes from the retorts, having been freed in the process of its production of nearly all foreign matter. It has, therefore, hitherto been regarded as a pure product—in other words, as being as nearly pure when taken from the retorts as it could be obtained.

I have discovered that this "gas-carbon" is composed of carbon in different conditions, and of carbon and soluble salts and other foreign matter, constituting impurities which are injurious to its best function. It is also found that the washing or treatment by elutriation of the pulverized crude product will remove all the soluble salts, and because of the difference of specific gravity of the different grades of this material the superior quality of the same may be separated from the inferior, and thus an approximately pure gas-carbon may be obtained and the entire mass graded according to its relative value, for the purposes indicated.

My object is to collect for use this lighter substance, which is composed of the purest carbon.

I can accomplish my purpose by either of the methods or devices hereinafter described—that is, by elutriation, or the continuous agitation of finely-pulverized crude carbon in water, and allowing the purest carbon to float over, or by separating this pulverized carbon in a dry state by gravitation or precipitation.

In separating by elutriation I take crude gas-carbon as it comes from the retort and pulverize it by any of the well-known methods for reducing hard substances. As the material is very refractory, care should be taken to use an apparatus which will reduce it as nearly as possible to an impalpable powder. From the pulverizer I convey it to the first of a series of tanks, as shown in the drawing accompanying this specification, and of which it forms a part. These tanks, which are filled with water, are arranged so as to overflow continuously from No. 1 through the series to No. 5. I have shown five tanks in the drawing, but the number is not essential, provided that a sufficient area and number are used to separate the carbon into the different grades required. The continuous supply of water sufficient to produce the proper overflow is admitted through the pipe B into tank No. 1, and the overflow-outlet for the water is shown at C.

A represents the pipe leading to tank No. 1, through which the pulverized carbon is admitted. I prefer to make the last tank in this series, which is here represented as No. 5, of greater length proportionately than the others. In practice this apparatus may consist of a single tank, which is divided by suitable partitions, as shown in the drawing. At the top of tank No. 5 I place the partitions D D D, extending below the surface of the water in said tank, in order to prevent the lighter material which accumulates in this tank from being washed away. The carbon, being received in tank No. 1, is thoroughly agitated by the current of water, and the coarser and heavier particles and impurities are precipitated in this tank. The valuable portion of this material now passes over to tank No. 2, where the same process is repeated, and so continuously through the series until the last tank is reached, where the partitions D D D retain the purest carbon, and where it may be collected. It is obvious that a proper relation should be preserved between the quantities of carbon and the inflowing and outflowing water.

I have thus described a process for separating the valuable portion of this material, and one that will be found useful in practice; but other methods may be employed by which the same result may be attained.

In separating the purer carbon from the crude in the dry way by gravitation or precipitation, I take the pulverized carbon and drive it with a rotary or other suitable blower into a depositing-chamber. This chamber I prefer to make narrow in width, but of considerable length and height. Upon the bottom or floor of this chamber I place partitions, running crosswise of the length, and of sufficient height to form bins for separating and holding the different grades of carbon that fall upon the floor in their passage from the blower through the chamber. It will readily be seen that the different grades of fineness and purity of the carbon between the partitions in the several bins will be approximate with their distance from the opening of the blower, the heavier material settling in the bins nearest and the lighter in those farthest from the blower. This material, obtained by either of the methods above described, or others analogous thereto, is now ready for use. It may be molded under pressure into any suitable form, in combination with any adherent substance, or otherwise, and presents in this form all or nearly all the characteristics of pure or nearly pure carbonaceous matter.

I am aware that the method of separating and purifying other materials by means of elutriation or precipitation is not uncommon, and such process, broadly, I do not claim; but What I do claim as new, and desire to secure by Letters Patent, is—

The process herein described of obtaining approximately pure carbon from the deposits of gas-retorts, which consists in reducing the mass to a fine powder and then subjecting the same to treatment by blast or current of air or water, substantially as described, whereby the heavier impurities first fall or settle and the lighter or purer portion is driven or carried forward, separated, and graded by reason of the difference of specific gravity between the carbon and its impurities.

FREDERICK H. SNYDER.

Witnesses:
H. B. STANTON,
CHARLLO A. OEHL.